US012759581B2

(12) United States Patent
Floor et al.

(10) Patent No.: US 12,759,581 B2
(45) Date of Patent: Oct. 13, 2026

(54) BIDIRECTIONAL PATH OPTIMIZATION IN A GRID

(71) Applicant: Motional AD LLC, Boston, MA (US)

(72) Inventors: Boaz Cornelis Floor, Cambridge, MA (US); Marc Dominik Heim, Boston, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 19/047,146

(22) Filed: Feb. 6, 2025

(65) Prior Publication Data

US 2026/0227191 A1 Aug. 6, 2026

Related U.S. Application Data

(63) Continuation of application No. 17/744,252, filed on May 13, 2022, now Pat. No. 12,246,749.

(60) Provisional application No. 63/332,976, filed on Apr. 20, 2022.

(51) Int. Cl.
*G01C 21/34* (2006.01)
*B60W 60/00* (2020.01)

(52) U.S. Cl.
CPC ..... *G01C 21/3453* (2013.01); *B60W 60/0013* (2020.02); *B60W 60/0015* (2020.02)

(58) Field of Classification Search
CPC .......... G01C 21/3453; B60W 60/0013; B60W 60/0015
See application file for complete search history.

(56) References Cited

U.S. PATENT DOCUMENTS

| | | | | |
|---|---|---|---|---|
| 5,612,883 | A | 3/1997 | Shaffer et al. | |
| 12,246,749 | B2 | 3/2025 | Floor et al. | |
| 2019/0079514 | A1* | 3/2019 | Zhu | G01C 21/3658 |
| 2021/0088345 | A1 | 3/2021 | Paden et al. | |
| 2021/0271245 | A1 | 9/2021 | Bradley et al. | |
| 2021/0373566 | A1 | 12/2021 | Agarwal et al. | |
| 2021/0402601 | A1 | 12/2021 | Wang et al. | |
| 2022/0283587 | A1 | 9/2022 | Kabzan et al. | |
| 2023/0159054 | A1 | 5/2023 | Jespersen et al. | |
| 2023/0219585 | A1 | 7/2023 | Eiras et al. | |

* cited by examiner

*Primary Examiner* — Michael V Kerrigan
(74) *Attorney, Agent, or Firm* — Knobbe, Martens, Olson & Bear, LLP

(57) ABSTRACT

Provided are methods, systems, and computer program products for bidirectional path optimization in a grid. An example method may include: receiving vehicle environment data associated with an environment of a vehicle; determining an occupancy map of the environment using the vehicle environment data, the occupancy map identifying at least one obstacle in the environment; generating a reference path to a destination location for the vehicle; determining a travel path to an intermediate location in the occupancy map based at least in part on the reference path and a longitudinal direction variable, wherein the intermediate location is proximate a point on the reference path; and generating actuation commands for the vehicle based at least in part on the travel path.

20 Claims, 12 Drawing Sheets

BIDIRECTIONAL PATH OPTIMIZATION IN A GRID

RELATED APPLICATIONS

Any and all applications for which a foreign or domestic priority claim is identified in the Application Data Sheet as filed with the present application are incorporated by reference under 37 CFR 1.57 and made a part of this specification. This application is a continuation of U.S. application Ser. No. 17/744,252, entitled BIDIRECTIONAL PATH OPTIMIZATION IN A GRID, which was filed on May 13, 2022, and which claims priority to U.S. Prov. App. No. 63/332,976, entitled BIDIRECTIONAL PATH OPTIMIZATION IN A GRID, which was filed Apr. 20, 2022, each of which is incorporated herein by reference in its entirety for all purposes and made part of this specification.

DETAILED DESCRIPTION

Figure 1:
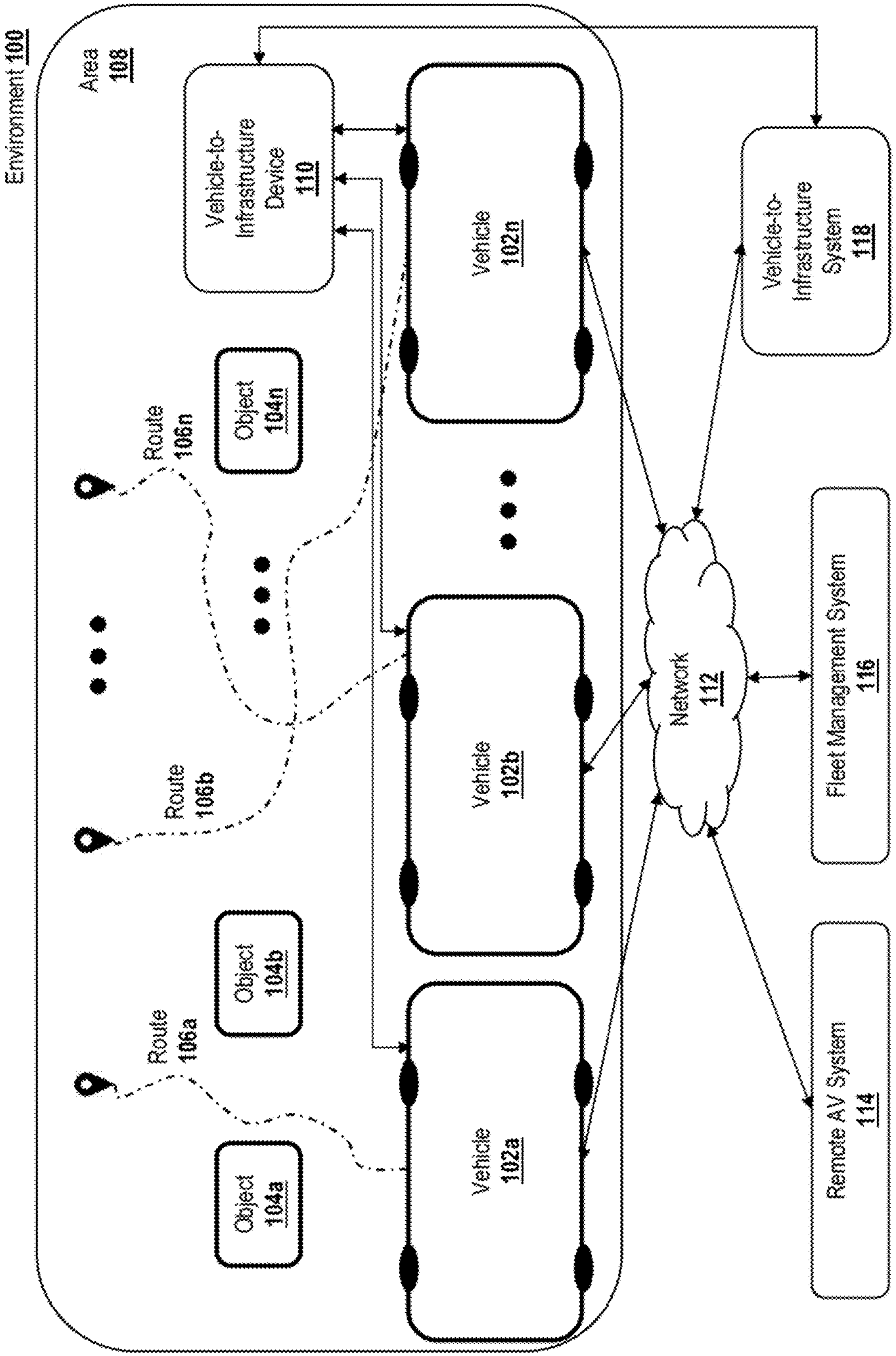
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a model predictive control system (referred to "MPC system" herein). As a non-limiting example, the MPC system may determine a travel path using an occupancy map (e.g., having occupancy grid representations of objects).

Occupancy grid representations may be used for motion planning processes of MPC systems. Occupancy grid representations may provide flexibility in representing environmental spatial constraints and potential to include moving objects and/or probabilistic measurements. However, outputs (e.g., travel paths) from a motion planning process may require a smoothing process (e.g., a continuous optimization) to account for more accurate vehicle dynamics and comfort of the planned travel path. Moreover, there may be a discrepancy in environmental representation for the smoothing process versus the motion planning process since occupancy grid representations may not be used for optimization in the smoothing process due to the discrete nature occupancy grid representations. Thus, in some cases, the MPC system may determine a travel path in an occupancy map based on a reference path. The MPC system may determine the reference path by, e.g., a sampling-based motion planning process and transform the reference path into the occupancy map. The MPC system determine potential paths in the occupancy map, determine costs associated with the potential paths, and select a potential path based on the determined costs (e.g., select a lowest cost path). In this manner, safety may be increased, and computational savings may be realized by determining the travel path in a same environmental representation (e.g., the occupancy map) as the path planning process.

For autonomous vehicles, navigating the autonomous vehicle in confined spaces may be a complex task. For instance, one difficulty may be that autonomous vehicles have non-holonomic vehicle motion constraints. As an example, the front-wheel steering design of autonomous vehicles may mean that forward motion is unable to allow for reachability of all target positions without collision. Thus, in some cases, the MPC system may determine the travel path in the occupancy map based on the reference path and a longitudinal direction variable. The longitudinal direction variable may be a variable adjusted to between change forward or backward driving. The MPC system may determine the potential paths by adjusting the longitudinal direction variable, thereby providing path optimization with forward and backward driving, to enable full maneuverability.

Moreover, the reference path may extend from a current location of the autonomous vehicle to a destination location. To reduce computation time (or conserve computational resources), the MPC system may determine the travel path using a set number of prediction steps to a MPC horizon. The MPC horizon may be an intermediate location in the occupancy map proximate (e.g., near to or on) the reference path. At each iteration of a solve cycle, the MPC horizon may be updated to correspond an expected travel distance for the set number of prediction steps from a current location (taking into account changes in the current location of the autonomous vehicle). The MPC horizon may be considered receding horizon.

Moreover, each iteration of the solve cycle may also update the occupancy map to correspond to changes in an environment (e.g., moving objects, a static object is now moving, etc.). Thus, in some cases, the MPC system may determine the travel path to the MPC horizon (or intermediate point) in the occupancy map based on the reference path and the longitudinal direction variable.

By virtue of the implementation of systems, methods, and computer program products described herein, an autonomous vehicle or AV system can determine a travel path in an occupancy map. Therefore, systems of the present disclosure may be an improvement to path optimization for autonomous vehicles and MPC systems in general.

Referring now to FIG. 1, illustrated is example environment 100 in which vehicles that include autonomous systems, as well as vehicles that do not, are operated. As illustrated, environment 100 includes vehicles **102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118** via wired connections, wireless connections, or a combination of wired or wireless connections.

Vehicles **102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106***a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
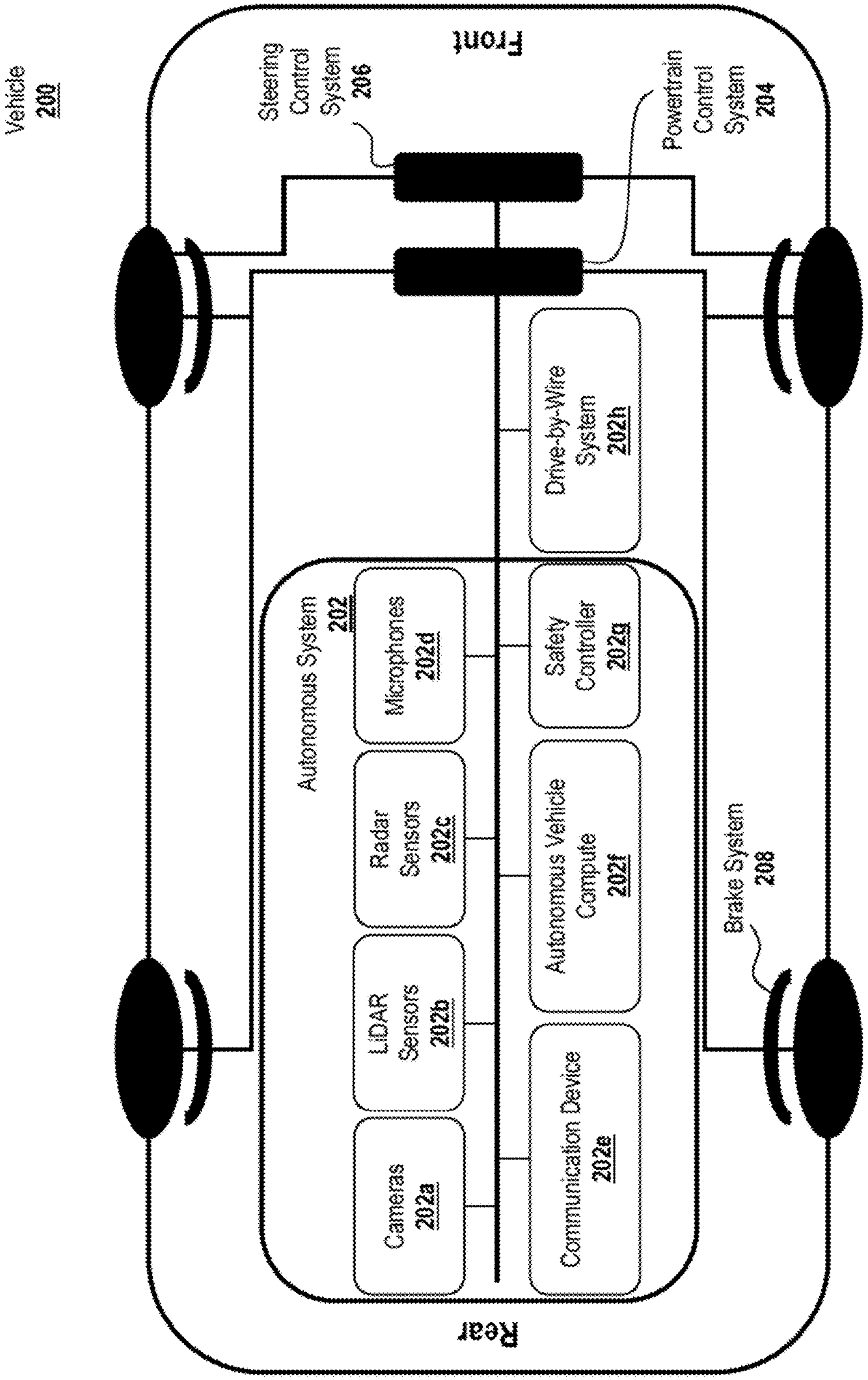
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and drive-by-wire (DBW) system 202*h*.

Figure 3:
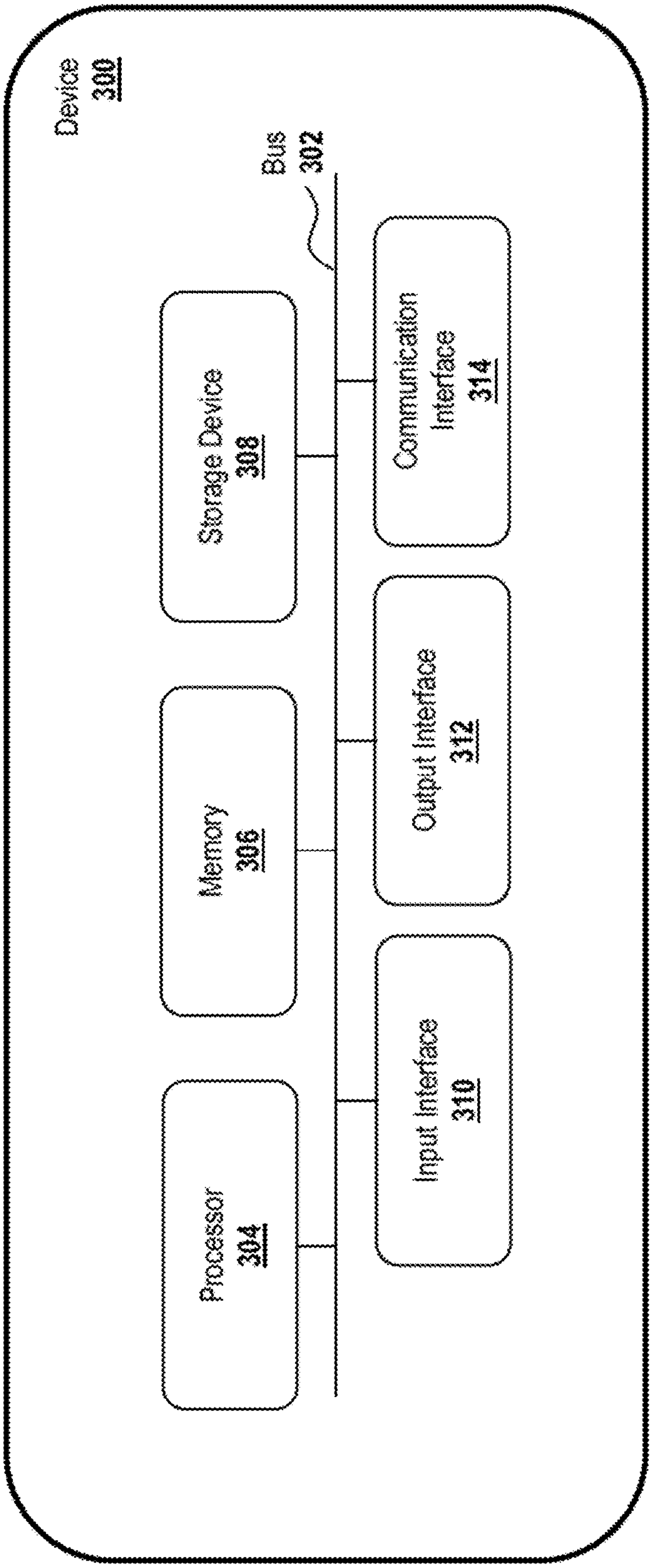
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data (TLD data) associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LIDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
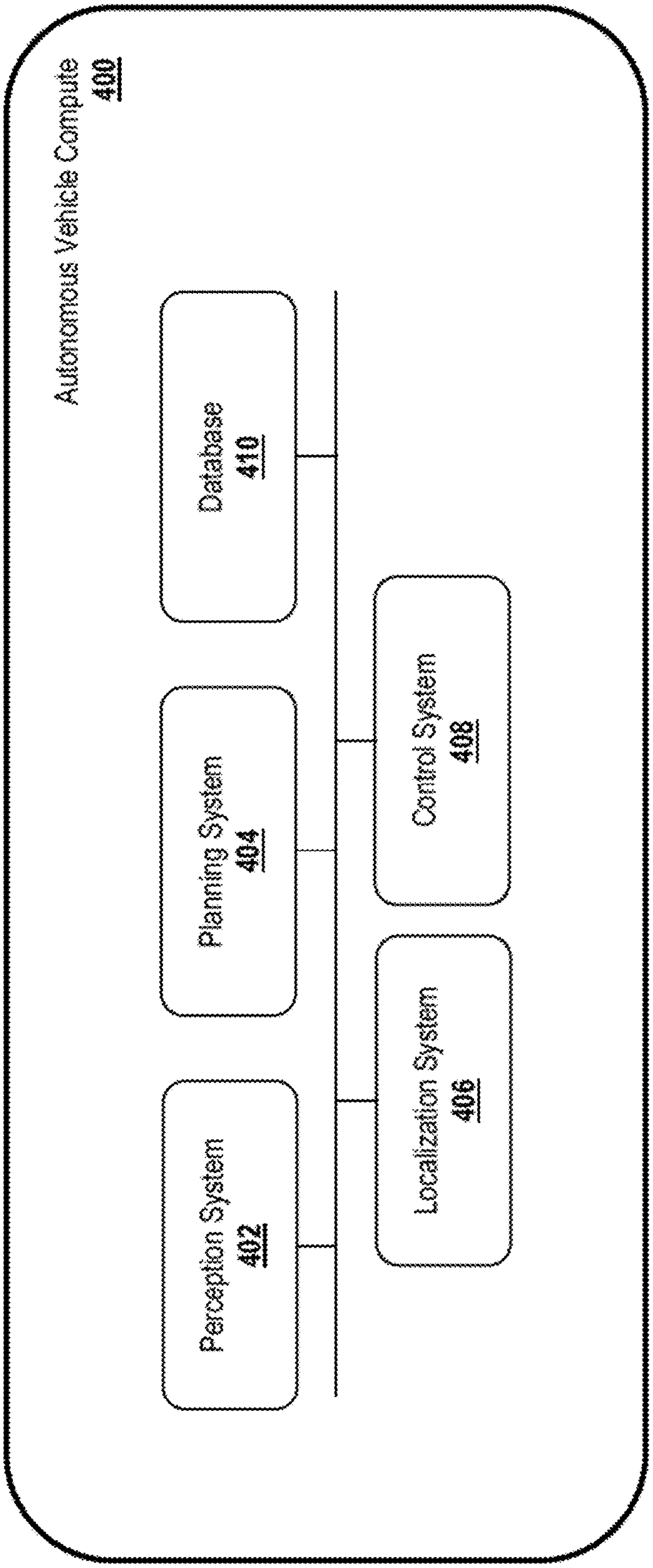
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system

404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute **202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118**, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras **202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402** classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors **202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406** comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system **202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200** to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LIDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Model Predictive Control System

Figure 5A:
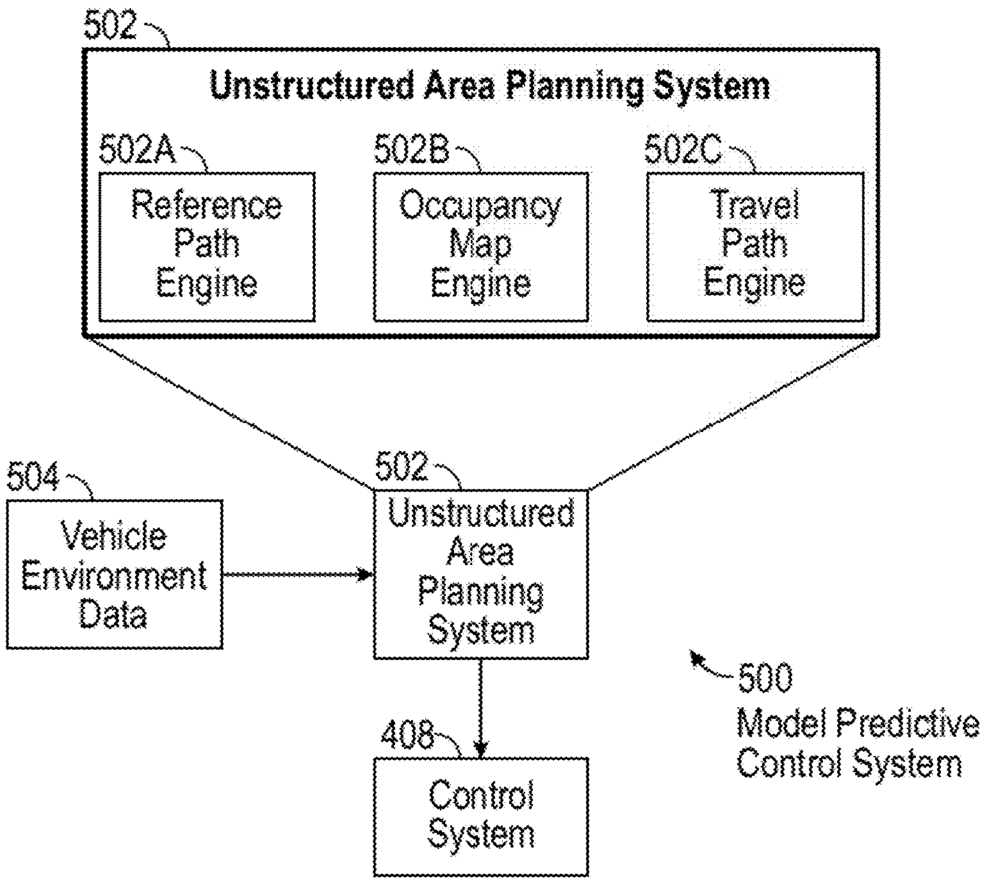
FIG. 5A is a block diagram illustrating an example of a model predictive control system.

FIG. 5A is a block diagram illustrating an example of a model predictive control system 500 (referred to "MPC system 500" herein). The MPC system 500 may determine a travel path for an autonomous vehicle using bidirectional path optimization in a grid. The MPC system 500 may include an unstructured area planning system 502 and the control system 408. The unstructured area planning system 502 may be a part of or separate from the planning system 404 as described herein. The unstructured area planning system 502 may determine the travel path for the autonomous vehicle and the control system 408 may execute control of the autonomous vehicle in accordance with the determined travel path.

The unstructured area planning system 502 may receive, periodically or continuously, vehicle environment data 504 from the perception system 402 and/or the localization system 406. The vehicle environment data 504 may include the data from perception system 402 (e.g., data associated with the classification of physical objects and the objects location, described above) and/or data associated with an updated position of the vehicle (e.g., vehicles 102) from localization system 406.

Figure 5B:
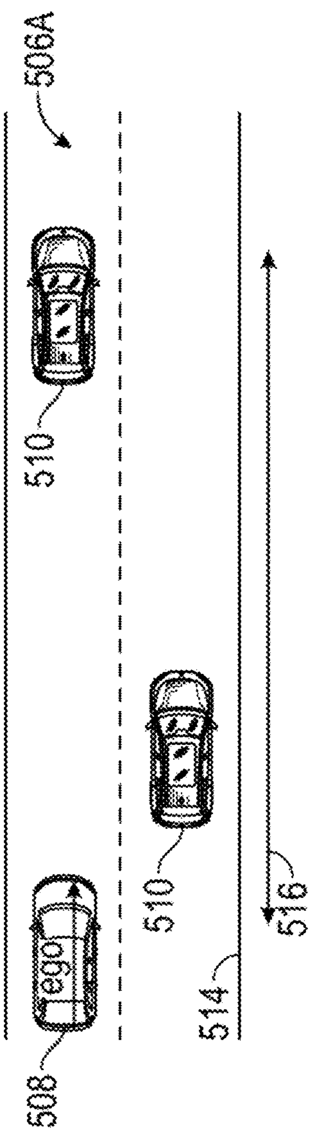
FIGS. 5B and 5C are illustrations of example environments a model predictive control system may encounter.
Figure 5C:
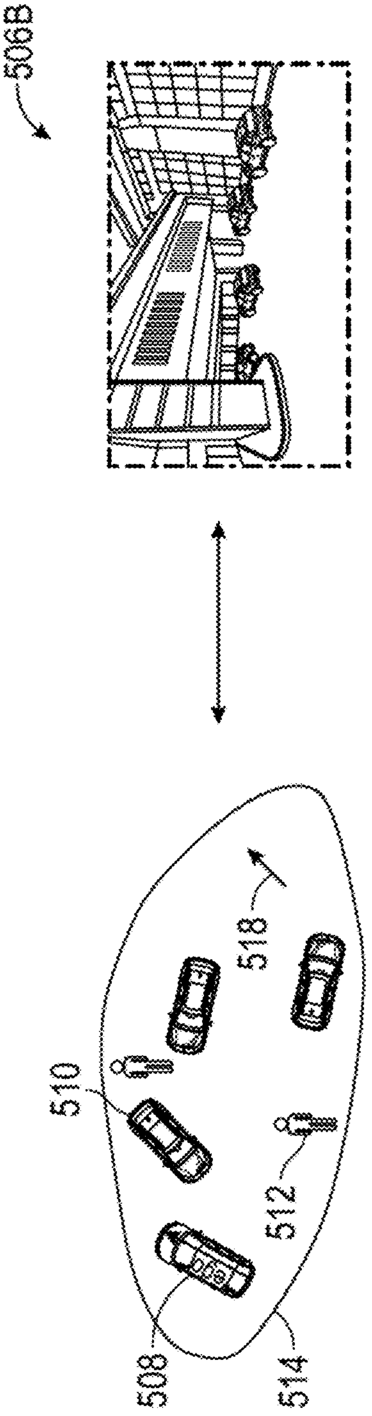

Turning to FIGS. 5B and 5C, FIGS. 5B and 5C are illustrations of example environments 506A and 506B a MPC system 500 may encounter. In each of environments 506A and 506B, the MPC system 500 may determine a state (location, orientation, velocity, etc.) of its own vehicle 508 (referred to as "ego 508") in an environment. For instance, the MPC system 500 may obtain the state of the ego 508 from the vehicle environment data 504, as indicated by the localization system 406. The MPC system 500 may also determine states (location, orientation, velocity, etc.) of other vehicles 510; states (location, orientation, velocity, etc.) of other objects 512 (e.g., mobile objects, such as people, etc., or fixed objects, such as physical environment, etc.); a local boundary 514 of the environment; a direction of travel 516; and/or a location of a target position 518. The MPC system 500 may obtain the states of other vehicles 510, states of other objects 512, the local boundary 514, and/or the direction of travel 516 from the vehicle environment data 504 and/or based on 2D and/or 3D maps from the database 410. For instance, states of other vehicles 510 and mobile other objects 512 may be detected, tracked, and reported by the perception system 402. For instance, the state of fixed objects, the local boundary 514, and/or the direction of travel 516 may be stored and extracted from the 2D and/or 3D maps. The MPC system 500 may determine the location of the target position 518 from a user input (e.g., via input interface 310) or other system (e.g., via communication interface 314), such as from a user device or a remote service, such as the fleet management system 116 or the remote AV system 114, and the like.

The environment 506A may be a structured environment, such as a lane environment or the like. The environment 506A may be well defined and maneuvering may be relatively easy to decide (e.g., slight adjustments within a lane, lane changes, or turns from one structured environment and to another). The environment 506B may be an unstructured environment, such as a parking environment, a shared environment (e.g., with pedestrians), or a non-structured environment (e.g., an environment not classified as structured, such as the environment 506A). In the case of the environment 506B, maneuvering may be more difficult, as the environment is less defined (e.g., there are fewer boundaries, like lanes, or rules to govern the environment) and the autonomous vehicle could get stuck (between boundaries and moving objects, etc.). Notably, in environment 506B, the MPC system 500 may not rely on other agents to follow particular road structure and/or predictable movement patterns. Thus, there is an inherent unstructured ness to the environment 506B.

In some cases, the MPC system 500 (or the planning system 404) may switch operation modes between structured modes or unstructured modes based on determining whether the vehicle is an unstructured environment or structured environment based on environment conditions. For instance, the MPC system 500 (or planning system 404) may determine whether the ego 508 is in a structured environment by determining certain characteristics of the environment satisfy certain environment conditions (e.g., lane markings exist, ego location in lane, and/or the like). If so, the MPC 500 may determine to operate in a structured mode; otherwise, the MPC 500 may determine to operate in an unstructured mode. Details of how the structured mode operate are omitted to streamline understanding of the unstructured mode as described herein.

In some cases, the MPC system 500 (or the planning system 404) may consider outputs from both the structured mode and the unstructured mode. In some cases, the MPC system 500 may determine whether the structured mode was able to find a solution and, if not, proceed with the unstructured mode. In some cases, the MPC system 500 may (if both determined solutions) evaluate which solved for a better solution. For instance, a determined travel path from the structured mode and the travel path from the unstructured mode may be scored and a travel path with a higher score may be selected. For instance, in some cases, the MPC system 500 may determine scores based on scoring rules, such as a comfort metric of a solution, how quick a solution brings the autonomous vehicle to a destination, a safety metric with respect to agents in the scene, and/or presence of collisions in a solution.

Returning to FIG. 5A, in the case the unstructured mode is executed by the MPC system 500, the unstructured mode may cause the MPC system 500 to determine a travel path using the unstructured area planning system 502. The unstructured area planning system 502 may include a reference path engine 502A, an occupancy map engine 502B, and a travel path engine 502C. As described herein, the MPC 500 may receive the vehicle environment data associated with an environment of a vehicle.

The reference path engine 502A may generate a reference path 704 (see FIGS. 7A and 7C) to a destination location (referred alternatively as "target position 518") for the vehicle. For instance, the reference path engine 502A may generate the reference path 704 to the destination location based on the vehicle environment data.

In some cases, the reference path engine 502A may determine the reference path 704 in a geographic coordinate system 604 or in an occupancy map coordinate system 608 (see FIG. 6A, discussed below). In the case the reference path 704 in is determined in the geographic coordinate system 604, the reference path engine 502A may iteratively compute the reference path 704, and determine whether collisions with objects would occur. For instance, the reference path engine 502A may transform the reference path 704 to the occupancy map coordinate system 608 and confirm no collisions would occur with objects in the occupancy map coordinate system 608. In the case the reference path 704 is determined in the occupancy map coordinate system 608, the reference path engine 502A may iteratively compute the reference path 704, and determine whether collisions with objects would occur. In some cases, to determine whether collisions with objects would occur, the reference path engine 502A may determine whether any point of a footprint of the ego 508 overlaps (e.g., are within a threshold distance) of a location of any object of the occupancy map. In this manner, the reference path 704 may be represented in the occupancy map (in the occupancy map coordinate system 608).

In some cases, the reference path engine 502A may determine the reference path 704 by a sampling-based routine. The reference path engine 502A may determine the reference path 704 iteratively and separately (e.g., asynchronously) from the MPC system 500 determination of the travel path, provided that the MPC system 500 has access to the latest determination of the reference path 704. Thus, in this manner, the MPC system 500 may rely on a same occupancy map for path optimization (e.g., determining the travel path) and path planning (e.g., determining the reference path 704).

In some cases, the reference path engine 502A may determine the reference path 704 in view of static objects that are represented in the occupancy map. For instance, the reference path engine 502A (or the occupancy map engine 502B discussed below) may determine whether an object is static (e.g., object has not moved in more than a threshold period) and, if so, add the static object to the occupancy map. In this manner, both the path planning and the path optimization may avoid collision with the static object. The reference path engine 502A, while executing the sampling-based routine, may determine the travel path 704 by evaluating discrete decisions (e.g., should ego 508 pass an object on the left or the right). In contrast, to determining the travel path, the MPC system 500 may determine the travel path in consideration of optimal motion around the reference path 704.

The occupancy map engine 502B may determine an occupancy map of the environment using the vehicle environment data 504. For instance, the occupancy map may identify at least one obstacle in the environment. The occupancy map may also identify at least a current state of the ego 508 and the target position 518. The occupancy map may be a grid representation of environmental spatial constraints (e.g., ego 508, other vehicles 510, other objects 512, local boundary 514, and the like). For instance, the occupancy map engine 502B may determine the occupancy map by iteratively obtaining the state of the ego 508, the states of other vehicles 510, the states of other objects 512, the local boundary 514 of the environment, the direction of travel 516, and/or the location of the target position 518 (also referred to herein as "representation data"). The occupancy map engine 502B may transform the representation data from the geographic coordinate system 604 to the occupancy map coordinate system 608 to construct the occupancy map. The occupancy map engine 502B may determine the occupancy map iteratively and separately (e.g., asynchronously) from the MPC system 500 determination of the travel path, provided that the MPC system 500 has access to the latest determination of the occupancy map. The occupancy map engine 502B may include the reference path 704 in the occupancy map (e.g., by transforming the reference path, as described herein).

The travel path engine 502C may determine a travel path to an intermediate location (e.g., an MPC horizon 716, discussed below) in the occupancy map based at least in part on the reference path 704 and a longitudinal direction variable. For instance, the intermediate location may be a point on the reference path 704 that is proximate a current location of the autonomous vehicle. In some cases, the intermediate location may be on the reference path 704 between the current location and the destination location. In some cases, the intermediate location 704 may be based on a predefined distance from the current location. The travel path engine 502C (or the control system 408) may generate actuation commands (e.g., steering angle and throttle) for the vehicle based at least in part on the travel path.

The longitudinal direction variable may be a range of continuous numbers (e.g., from −1 to 1, inclusive). In some cases, the continuous numbers that satisfy a number threshold represent a first longitudinal direction and the continuous numbers that do not satisfy the number threshold represent a second longitudinal direction. For instance, the first longitudinal direction may be a forward direction of the vehicle (e.g., vehicle moves forward) and the second longitudinal direction may be a backward direction (e.g., vehicle moves in reverse). For instance, the number threshold may be satisfied if the longitudinal direction variable is greater than (or equal to) zero.

In some cases, the occupancy map engine 502B may determine a physical location of the vehicle in a physical coordinate system and determine an occupancy map location of the vehicle by transforming the physical location of the vehicle from the physical coordinate system to a coordinate system of the occupancy map. For instance, the occupancy map engine 502B may obtain the physical location of the vehicle from the vehicle environment data and apply coordinate frame transformations to the physical location to transform the physical location in the physical coordinate system to the coordinate system of the occupancy map. Further, the travel path engine 502C, to determine the travel path to the intermediate location, may determine the travel path to the intermediate location using the occupancy map location of the vehicle.

In some cases, the occupancy map engine 502B may transform the reference path 704 from the physical coordinate system to the coordinate system of the occupancy map. For instance, the occupancy map engine 502B may apply the coordinate frame transformations to the reference path 704 to transform the reference path 704 in the physical coordinate system to the coordinate system of the occupancy map. Further, the travel path engine 502C, to determine the travel path to the intermediate location, may determine the travel path to the intermediate location in the occupancy map using the reference path 704 in the coordinate system of the occupancy map.

In some cases, the occupancy map engine 502B may transform the reference path 704 and the physical location of the vehicle from the physical coordinate system to the coordinate system of the occupancy map. For instance, the occupancy map engine 502B may apply the coordinate frame transformations to the reference path 704 and the physical location of the vehicle to transform the reference path 704 and physical location of the vehicle in the physical coordinate system to the coordinate system of the occupancy map. Further, the travel path engine 502C, to determine the travel path to the intermediate location, may determine the travel path to the intermediate location in the occupancy map using the reference path 704 and the physical location of the vehicle in the coordinate system of the occupancy map.

In some cases, the travel path engine 502C may transform the travel path from the coordinate system of the occupancy map to the physical coordinate system. For instance, the travel path engine 502C may apply the coordinate frame transformations to the travel path to transform the travel path in the coordinate system of the occupancy map to the physical coordinate system. In this case, the travel path engine 502C may generate the actuation commands for the vehicle using the travel path in the physical coordinate system.

In some cases, the travel path engine 502C may generate at least one differentiable occupancy map evaluation using the occupancy map. For instance, the travel path engine 502C may convert discrete grid occupancies of objects (e.g., object X in grid location Y) into differentiable occupancy map evaluations for the objects. Differentiable occupancy map evaluations may avoid non-continuous jumps in object representation. In this case, the travel path engine 502C, to determine the travel path to the intermediate location, may determine the travel path to the intermediate location using the at least one differentiable occupancy map evaluation. For instance, to generate the at least one differentiable occupancy map evaluation, the travel path engine 502C may apply at least one basis function to the occupancy map. For instance, the at least one basis function may be at least one third order B-spline basis function. Details of using a third order B-spline basis function to determine the at least one differentiable occupancy map evaluation may be found in Ser. No. 17/535,542, which is incorporated by reference in its entirety.

In some cases, the travel path engine 502C, to determine the travel path, may determine a plurality of potential paths based at least in part on at least one physical constraint of the vehicle and variations to a plurality of variable control inputs. Then the travel path engine 502C may determine a cost associated with each of the plurality of potential paths based at least in part on a weighting policy of an objective function. Then the travel path engine 502C may select the travel path from the plurality of potential paths based at least in part on the determined cost associated with each of the plurality of potential paths.

To determine the plurality of potential paths, the travel path engine 502C may generate the plurality of potential paths by adjusting variable control inputs for a preset number of prediction steps. To generate the plurality of potential paths, the travel path engine 502C may generate a plurality of sets of variable control inputs for a period corresponding to the current location to the intermediate location, with a number of steps (referred to "prediction steps") therebetween. The variable control inputs may include a steering angle and a longitudinal direction for the longitudinal direction variable. Note, in some cases, the control inputs may also include a throttle amount. Each set of variable control inputs may sequentially define control inputs to traverse to each step of the number of steps, in accordance with the at least one physical constraint of the vehicle. For instance, a first set of control inputs may define a first potential path from the current location to the intermediate location, such that the vehicle would traverse a first defined path, while a second set of control inputs may define a second potential path from the current location to the intermediate location, such that the vehicle would traverse the second defined path. Each control input may be within the physical constraint of the vehicles at each step. For instance, each variable control input (at each step) may satisfy a physical condition of operational ability of the vehicle. As an example, certain changes in steering angle and/or throttle may be physically possible for the vehicle (at that step), while other certain changes in steering angle and/or throttle may be physically impossible for the vehicle (at that step). Each control input, of each set of control inputs, may satisfy at least one physical constraint of the vehicle at a corresponding step. Each of the plurality of sets of variable control inputs may define a potential path in accordance with locations of steps each control input indicates.

In some cases, the at least one physical constraint of the vehicle includes a steering angle of operation of a steering wheel of the vehicle. For instance, the steering angle of operation of the steering wheel may be constrained to a set range of steering angles (e.g., from +/−45 degrees from current heading). In some cases, the at least one physical constraint of the vehicle constrains a cartesian solution space of the travel path to within a region a predetermined distance from the reference path 704. For instance, the cartesian solution space may be a geographic area within the coordinate system of the occupancy map within the predetermined distance from the reference path 704, such that each step may be located within the cartesian solution space. In some cases, the at least one physical constraint of the vehicle constrains a vehicle heading to within a predetermined range of headings with respect to a given point on the reference path 704. For instance, the predetermined range of headings with respect to the given point on the reference path 704 may be a defined +/−degrees of heading from a current location of the vehicle with respect to the reference path 704.

In some cases, each of the plurality of potential paths can include a plurality of unit-distant steps. Each of the unit-distance steps can correspond to one of the number of steps from the current location to the intermediate location. In some cases, each unit-distance step may be defined as a ratio of the distance between current location to the intermediate location (traversing the potential path) and the number of steps.

To determine the cost associated with each of the plurality of potential paths, the travel path engine 502C may generate a cost for each of the plurality of potential paths using an objective function. For instance, a cost, for a potential path, may be determined based at least in part on the weighting policy of the objective function and occupancy map and control inputs for the potential path. The weighting policy may assign at least one sub-cost for characteristics of the potential path. For instance, the weighting policy may assign a plurality of sub-costs. The plurality of sub-costs may include at least a first sub-cost, a second sub-cost, and a third sub-cost.

The first sub-cost may be a collision-free motion cost. The collision-free motion cost may be based on an accumulation of collision costs, for all prediction steps, for each of a set of points of a vehicle footprint with respect to the at least one obstacle in the environment. For instance, the collision cost may be proportionally higher when a first point of the set of points of the vehicle footprint overlaps with a position of the at least one obstacle in the environment, then a second a point of the set of points of the vehicle footprint that does not overlap with a position of the at least one obstacle in the environment. The accumulation of collision costs, for all prediction steps, may add together all collision costs of all points across all prediction steps to indicate any physical interaction with the environment. The weighting policy may assign relatively high weights to such interactions to thereby avoid selection of any such travel paths.

The second sub-cost may be a comfort cost. The comfort cost may be based on, at each prediction step, at least a change rate of the longitudinal direction variable and a change rate of a steering angle. For instance, the comfort cost may be proportionally higher as a change rate of the longitudinal direction variable or a change rate of a steering angle increase. The weighting policy may assign weights for the change rates to thereby ensure comfortable (e.g., for human comfort) traversal between the current location to the intermediate location.

The third sub-cost may be tracking cost. The tracking cost may be based on, at each prediction step, a first difference from a reference heading of the reference path 704 at a tracking target location and a second difference from a reference location of the reference path 704 at the tracking target location. In some cases, at each prediction step, the first difference is a difference between the steering angle (as indicated by the control inputs for that step) and the steering angle indicated by the reference path 704. In some cases, at each prediction step, the second difference is a difference between the location (as indicated by the control inputs for that step) and a corresponding location indicated by the reference path 704. The weighting policy may assign different weights for the first and second differences to thereby prefer convergence to the intermediate location.

In some cases, the weighting policy may include a plurality of weights for the collision-free motion cost, the comfort cost, and the tracking cost to prefer different costs. For instance, a set of weights of the plurality of weights for the tracking cost may include an intermediate weight for an intermediate prediction step before a final prediction step, and a final weight for the final prediction step. The intermediate weight may be substantially smaller than the final weight. For instance, this may prefer potential paths that end closer to the reference path 704 than farther away from the reference path 704.

In some cases, the travel path engine 502C may add together each of the collision-free motion cost, the comfort cost, and the tracking cost for each of the plurality of potential paths, to determine a total cost for the potential travel path. In this way, the total cost for each plurality of potential paths may be determined and a relative benefit of each may be considered.

The travel path engine 502C may select a lowest cost travel path. For instance, the travel path engine 502C may determine the lowest cost travel path by ordering the costs of the potential paths (e.g., from highest to lowest) and selecting a lowest costs potential path as the travel path. In some cases, the travel path engine 502C may determine whether the selected travel path has cost less than a cost threshold; if so, proceed; and, if not, iteratively re-determine the travel path until a selected travel path has a cost less than the cost threshold (or determine an error and perform a safety stopping maneuver if a threshold iteration counter is exceeded without a satisfactory solution).

As mentioned above, once a travel path is selected, the travel path engine 502C (or the control system 408) may generate actuation commands (e.g., steering angle and throttle) for the vehicle based at least in part on the travel path. Therefore, the disclosed methods and system may be a grid-based path process that uses an environmental representation for both a planning algorithm (e.g., the reference path 704) and path selection in accordance with the costs. For instance, having the occupancy map in the path selection routine may allow the MPC system 500 to represent spatial constraints accurately, allowing for tight space navigation. Moreover, the MPC system 500 may use the longitudinal direction variable to enable full range of motion for complex maneuvering.

Moreover, the combination of occupancy map-based spatial constraints and reverse driving (e.g., the longitudinal direction variable) for maneuverability, may be equally applicable to path optimization performed in unstructured environments beyond autonomous vehicles. Therefore, the unstructured mode to determined a travel path may also be applicable to drone navigation in 3D, mobile robot navigation (such as cleaning robots, surveillance robots, agricultural robots), autonomous boats, and the like. Furthermore, the methods and system may be used in trajectory selection, by incorporating a time component in the selection process. Further, the occupancy map may include probabilistic properties of measurements of the environment and costs associated with the risk of colliding with certain objects in the environment, thereby extending path planning to include probabilistic properties.

Example

In some cases, the MPC system 500 may determine the travel path using a MPC solver (e.g., as a part of the travel path engine 502C) that is time-invariant (e.g., using the unit-distance steps) and bi-directional (e.g., using the longitudinal direction variable). In this case, the MPC system 500 may determine a throttle (or speed) control separately from steering controls or forward/reverse controls. For instance, in some MPC solvers, the MPC solvers may propagate vehicle state over time to determine a solution (e.g., an optimized or lowest cost solution) for a trajectory. However, in this example, the MPC system 500 may use unit-distance steps (instead of time steps) to determine a travel path, instead of a trajectory, to the MPC horizon 716. Thus, the MPC system 500 may plan in space, and not in time. In particular, the MPC system 500 may determine a travel path that is a local minimum of an objective function (1), such that an equality constraint (2), a state constraint (3), and an input constraint (4) are satisfied.

Equation (1)

$$z^*_{1:N}, u^*_{1:N-1} = \sum_{k=1}^{N-1} J_{stage}(z_k, u_k, p_k) + J_{terminal}(z_N, p_N) \quad \text{Objective function}$$

Where $$z^*_{1:N}$$

is a travel path of 1 through N state vectors z, and $u^*_{1:N-1}$ are inputs to obtain the travel path that are a minima of costs $J_{stage}(z_k, u_k, p_k)$ and $J_{terminal}(z_N, p_N)$, discussed in detail below with respect to FIGS. 7A-7C, with $p_k$ and $p_N$ being objects in the occupancy map (e.g., vehicles, pedestrians, boundaries (such as a curb), and the like).

Equality Constraint $$z_{k+1} = f(z_k, u_k) \quad \text{Equation (2)}$$

State Constraint $$z \in Z, z = [x \ y \ \theta \ d \ \delta] \quad \text{Equation (3)}$$

Input Constraint $$u \in U, u = [u_{d'} u_{\delta'}] \quad \text{Equation (4)}$$

Where z is a state vector (in the set of all possible state vectors Z), with x being an x-map coordinate of the vehicle, y being a y-map coordinate of the vehicle, θ being a heading of the vehicle, d is the longitudinal direction variable, and δ being a steering angle of the vehicle; u is an input vector (in the set of all possible input vectors U), with $u_{d'}$ being a change rate or direction variable over progress and $u_{\delta'}$ being a change rate of steering angle over progress; N is a pre-set number of unit-distant steps $\lambda_k$ between a current location and the MPC horizon 716 (e.g., the intermediate location proximate the reference path 704).

For instance, in some cases, the pre-set number N of unit-distant steps $\lambda_k$ may be a design parameter that can be altered. More steps use more computation time to determine a travel path, but the MPC horizon 716 may be further along the reference path 704. The pre-set number N of unit-distant steps $\lambda_k$ may be fixed or variable. The unit-distant steps $\lambda_k$ may represent a maximum distance traveled per step. Thus, for a longer distance to travel to the MPC horizon 716, more steps may be used.

In some cases, the MPC solver of the MPC system 500 may determine the travel path iteratively. For instance, the MPC solver may determine the travel path from a current location to the MPC horizon 716, but the MPC system 500 (or the control system 404) may only execute a first part of determined travel path. However, it will be understood that the MPC system 500 may execute parts or all of the determined travel path. In a next solve cycle, the MPC solver may determine a new travel path for a new MPC horizon. The MPC horizon 716 may be referred to as a receding horizon (over the course of separate iterations of the solve cycle). In some cases, the occupancy map may be updated at each solve cycle (or when new data is available), In this manner, the MPC solver may take new measurements into account.

In some cases, the pre-set number N of unit-distant steps $\lambda_k$ may be a number in a range between 50-100. In some cases, the solve cycle may have a frequency of 10 Hz. The range between 50-100 and the 10 Hz frequency are examples and not intended to be limiting.

In some cases, the MPC horizon 716 may be determined by selecting a point on the reference path 704 that is between the current location (for the current step) of the vehicle and the destination location. For instance, the MPC system 500 may select a location on the reference path 704 that is within a threshold distance of the current location. The threshold distance may correspond to a finite horizon of the MPC solver (e.g., based on the pre-set number N of unit-distant steps $\lambda_k$).

In some cases, some or all constraints described above may be converted to very steep costs (e.g., 10×, 100×, etc. of other costs). In this manner, the non-continuous constraints may enable the MPC solver of the MPC system to numerically solve such nonlinear optimization.

The equality constraint may define a vehicle state update equation through state derivatives with respect to progress in accordance with state derivatives (5).

State Derivatives $$f(z_k, u_k) = \frac{\partial_z}{\partial_s} = \left[\frac{\partial x}{\partial s} \frac{\partial y}{\partial s} \frac{\partial \theta}{\partial s} \frac{\partial d}{\partial s} \frac{\partial \delta}{\partial s}\right] = \left[d \cdot \cos\cos\theta \, d \cdot \sin\sin\theta \, \frac{d}{L} \cdot \cos\cos\delta \, u_{d'} u_{\delta'}\right] \quad \text{Equation (5)}$$

Where L is the length of the vehicle. In this manner, the decision variables (e.g., the longitudinal direction variable d and steering angle δ) may be varied to find a local minima travel path in accordance with costs $J_{stage}(z_k, u_k, p_k)$ and $J_{terminal}(z_N, p_N)$, discussed below. As mentioned above, the longitudinal direction variable may be continuous (whereas it is a binary (i.e., discrete) value for forward or reverse directions).

In some cases, the MPC system 500 may use a progress scaling value σ that parameterizes a maximum traveled distance per prediction step for the unit-distant steps $\lambda_k$. In this case, distance traveled s(λ) may be obtained by integrating the direction variable times the progress scaling over a prediction horizon, in accordance with distance traveled integration (6).

Distance Traveled Integration $$s(\lambda) = \sigma \int_0^{\lambda} d(\lambda')\partial\lambda' \quad \text{Equation (6)}$$

Moreover, in this case, the progress scaling variable may enable parameterization of maximum traveled distance, in accordance with vehicle state update equation (7), scaled with the progress scaling variable.

Vehicle State Update Equation $$\frac{\partial_z}{\partial_s} = f(z, u) = \sigma \cdot f_u(z, u) \quad \text{Equation (7)}$$

As the progress scaling value σ increases, a path length of the travel path may increase, for a same number N of unit-distance steps unit-distant steps $\lambda_k$. As an example, an N set to 80 steps may have a computation time of 50 milliseconds, and adjusting the progress scaling value σ may enable the MPC system 500 to consider additional potential paths to search for more optimal (e.g., lower cost) solutions.

In some cases, the MPC system 500 may obtain data (e.g., the vehicle environment data) and update the occupancy map. In this way, $p_k$ and $p_N$ may be updated as new information indicates changes in the environment.

Figure 6A:
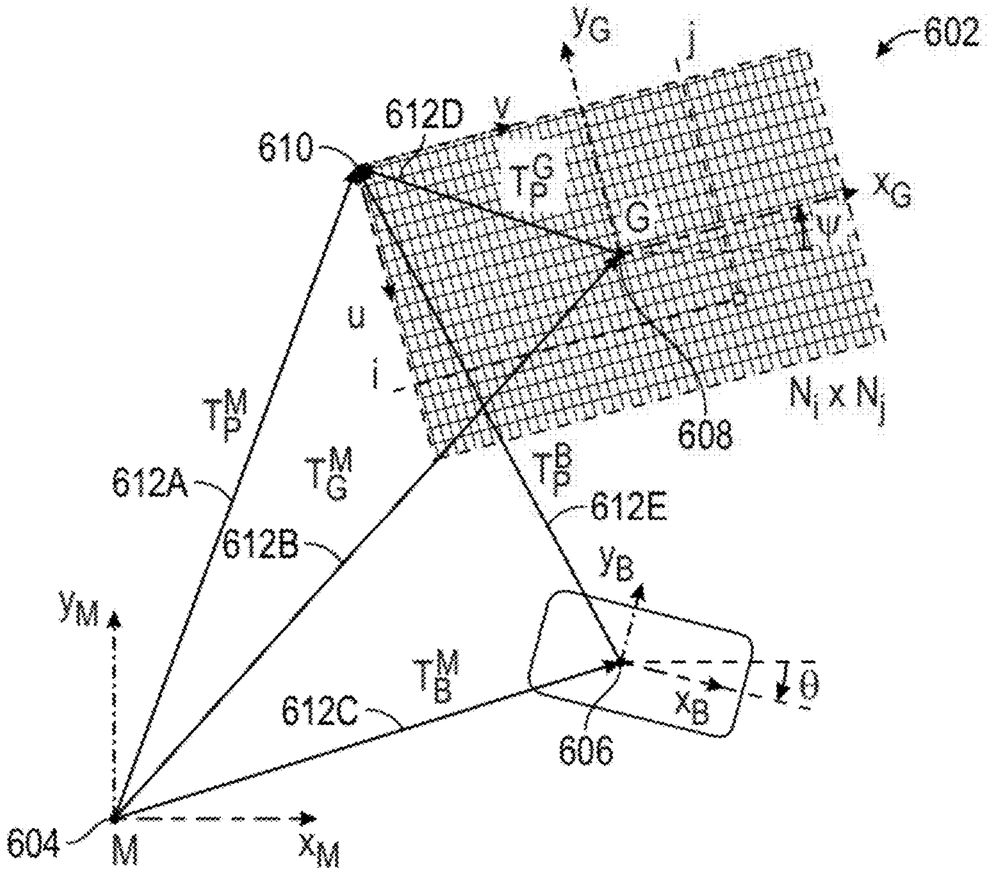
FIG. 6A is an illustration of example coordinate frame transformations used by a model predictive control system.

Turning to FIG. 6A, FIG. 6A is an illustration of example coordinate frame transformations 602 used by a MPC system 500. The coordinate frame transformations 602 may include a geographic coordinate system 604, a body coordinate system 606, and an occupancy map coordinate system 608, and at least one object coordinate system 610. The geographic coordinate system 604 may define a 2D or 3D spatial system for a geographic area, such as GPS coordinate system. The body coordinate system 606 may define a 2D or 3D spatial system for the ego 508. The occupancy map coordinate system 608 may define a 2D or 3D spatial system for a local geographic area. The at least one object coordinate system 610 may define a 2D or 3D spatial system for at least one object. Note, each object of occupancy map may have a corresponding object coordinate system 610 to define a 2D or 3D spatial system for that object. In particular, objects such as other vehicles 510, other objects 512, local boundary 514, and reference path 704 may each have an object coordinate system 610.

The coordinate frame transformations 602 may also include transformations 612A-612E from one coordinate system to another coordinate system. For instance, the transformations 612A-612E may include a first transformation 612A from the geographic coordinate system 604 to an object coordinate system 610; a second transformation 612B from the geographic coordinate system 604 to the occupancy map coordinate system 608; a third transformation 612C from the geographic coordinate system 604 to the body coordinate system 606; a fourth transformation 612D from the occupancy map coordinate system 608 to an object coordinate system 610; and a fifth transformation 612E from the body coordinate system 606 to an object coordinate system 610.

As described herein, the MPC system 500 may update the occupancy map and then transform the environment (e.g., other objects and the like), the reference path 704, and ego 508 from their state in the geographic coordinate system 604 to the occupancy map coordinate system 608. The MPC system 500 may then determine the travel path in the occupancy map coordinate system 608. The MPC system 500 may then transform the travel path from the occupancy map coordinate system 608 to the geographic coordinate system 604, for use by the control system 404. In this manner, the MPC system 500 may determine the travel path without internal transformation, thereby avoiding additional computations during the determination of the travel path. Moreover, transforming from the geographic coordinate system 604 to the occupancy map coordinate system 608 may enable higher accuracy using floating point numbers, as changes in a given number may be more accurately tracked using floating point numbers. As an example, the accuracy of floating point numbers may be worse for a change of 5000 to 5000.5 meters (in the geographic coordinate system 604) as compared to a change of 10 to 10.5 meters (in the occupancy map coordinate system 608). Note, the occupancy map coordinate system 608 may be considered an inertial frame during the solve cycle as each object is treated as stationary for the solve cycle.

In this manner, the occupancy map may be used to determine the travel path. However, as the MPC solver of the MPC system 500 may use continuous functions instead of discrete grid representation to determine the travel path, the MPC system 500 may determine differentiable occupancy map evaluations to avoid non-continuous jumps in object representation. For instance, in order to implement costs functions for MPC solver encoded by the occupancy map, the MPC system 500 may generate gradients (referred to as continuously differentiable grid evaluations) of the occupancy map.

Figure 6B:
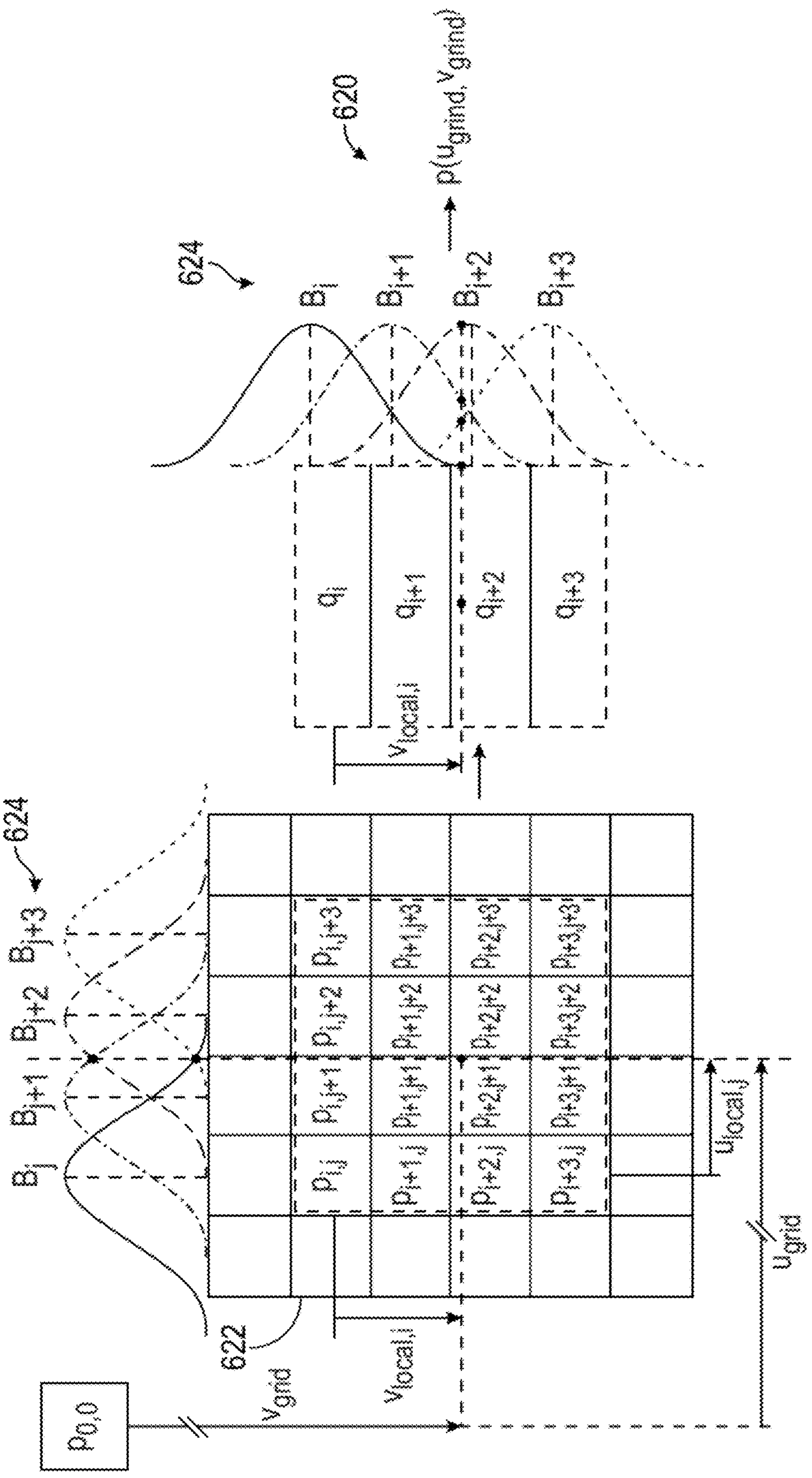
FIG. 6B is an illustration of a two-dimensional grid being evaluated with basis functions to provide continuously differentiable grid evaluations used by a model predictive control system.

Turning to FIG. 6B, FIG. 6B is an illustration 620 of a two-dimensional grid 622 being evaluated with basis functions 624 to provide continuously differentiable grid evaluations 626 used by the MPC system 500. The two-dimensional grid 622 may be evaluated with basis functions 624 to determine continuously differentiable grid evaluations 626. For example, each point of evaluation in the two-dimensional grid 622 may be sampled from a 4×4 region, e.g., as a result of a finite support of the basis functions 624. The continuously differentiable grid evaluations 626 may provide analytical partial derivatives for gradient based methods of the MPC solver of the MPC system 500. As described herein, basis functions 624 may be third order B-spline basis function.

Figure 6C:
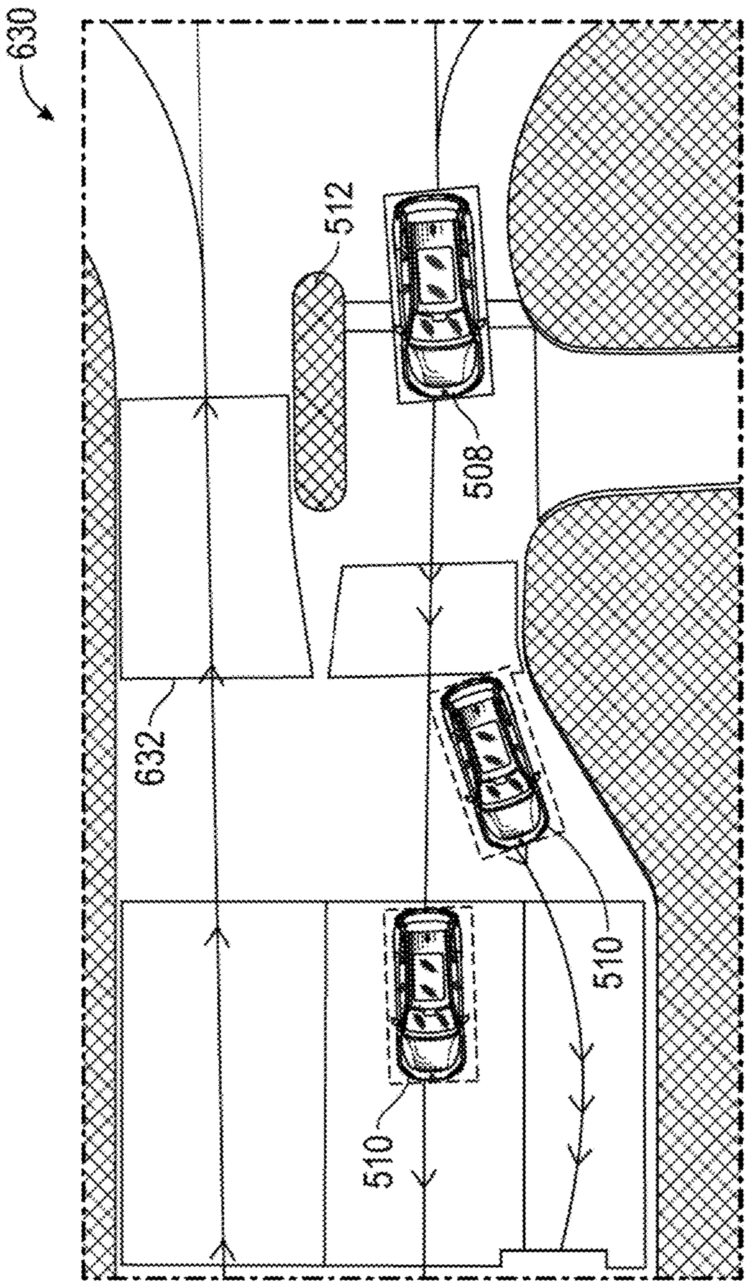
FIG. 6C is an illustration of an example occupancy map used by a model predictive control system.

Turning to FIG. 6C, FIG. 6C is an illustration of an example occupancy map 630 used by the MPC system 500. The occupancy map 630 may include the ego 508, other vehicles 510, and other objects 512, and the like. The occupancy map 630 may also include a grid representation 632. The grid representation 632 may have standard and/or arbitrary shapes of grids. While not depicted, the occupancy map 630 may include data indicating continuously differentiable grid evaluations 626 for the grid representation 632. Since the occupancy map has been generated with continuously differentiable grid evaluations 626, the MPC system 500 may determine costs $J_{stage}(z_k, u_k, p_k)$ and $J_{terminal}(z_N, p_N)$.

Figure 7A:
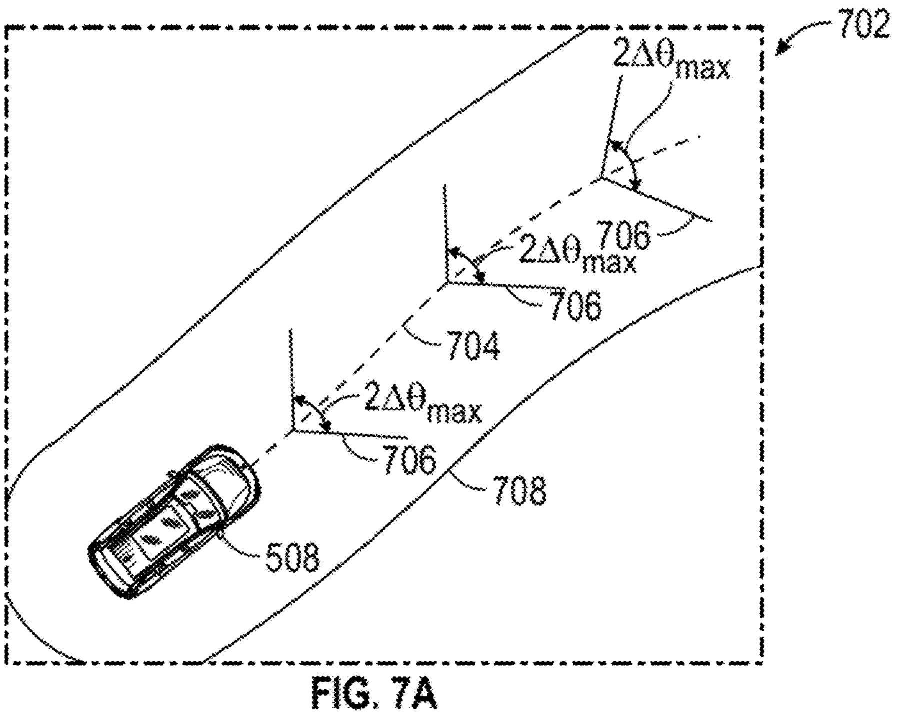
FIGS. 7A through 7C are illustrations of example additional constraints and costs used by a model predictive control system.
Figure 7B:
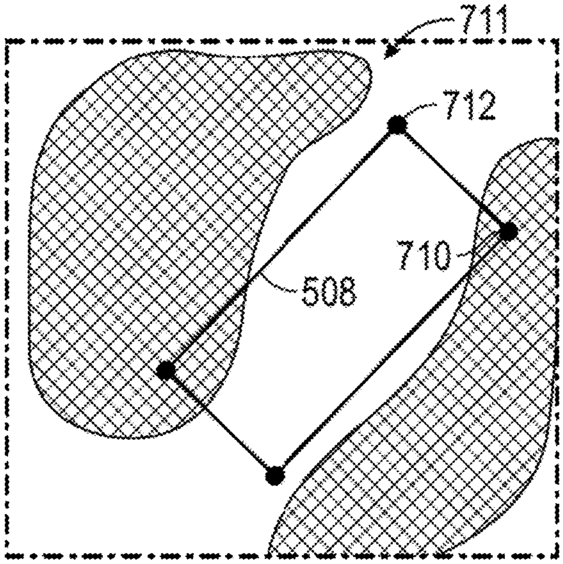
Figure 7C:
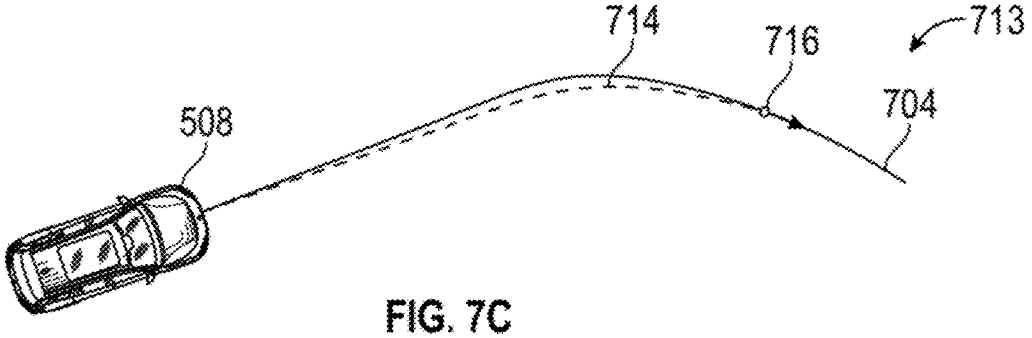

FIGS. 7A through 7C are illustrations of example additional constraints and costs used by the MPC system 500. FIG. 7A is an illustration 702 of additional constraints, while FIGS. 7B and 7C are illustrations 711 and 713 of certain costs determined by $J_{stage}(z_k, u_k, p_k)$ and $J_{terminal}(z_N, p_N)$.

In some cases, the MPC system 500 may further constrain the cartesian solution space (of the occupancy map), such that (only) certain state vectors z may be permissible for any given u. In FIG. 7A, additional constraints may include a heading constraint 706 and/or a boundary constraint 708 with respect to a reference path 704. As described herein, reference path 704 may be determined by the sampling-based routine.

The heading constraint 706 constrains vehicle heading relative to the reference path 704 to enforce a heading that generally tracks the reference path 704. For instance, the heading constraint 706 may remove potential paths that have a state vector z that have a heading θ greater than a heading threshold, such as $2\Delta\theta_{max}$, where $2\Delta\theta_{max}$ is a range of headings θ at a corresponding point on the reference path 704 to the state vector z. Thus, as depicted in FIG. 7A, the heading constraint 706 is depicted at several locations on the reference path 704, for different unit-distant steps $\lambda_k$.

The boundary constraint 708 constrains vehicle locations relative to the reference path 704 to enforce a travel path that generally tracks the reference path 704. For instance, the boundary constraint 708 may remove potential paths that have a state vector z that have a location [x, y] more than a distance threshold from the reference path 704. Thus, as depicted in FIG. 7A, the boundary constraint 708 is depicted as an artificial boundary a set distance from the reference path 704.

In this manner, the MPC system 500 may converge to a determined travel path that generally tracks the reference path 704 without requiring the determined travel path to be exactly the same as the travel path 704. Thus, the reference path 704 may initialize the MPC solver of the MPC system 500 to allow the MPC solver to converge faster than without a reference path 704. For instance, the MPC system 500 may determine the travel path, e.g., 10 times faster using the reference path 704 than without using the reference path 704.

In some cases, costs $J_{stage}(z_k, u_k, p_k)$ and $J_{terminal}(z_N, p_N)$ may adhere to a cost hierarchy. For instance, the cost hierarchy may (in order) be a collision-free motion objective, a comfort objective, and a tracking objective. In particular, stage costs $J_{stage}(z_k, u_k, p_k)$ may be defined by stage costs equation (8) and terminal costs $J_{terminal}(z_N, p_N)$ may be defined by terminal costs equation (9).

Stage Costs Equation $$J_{stage}(z_k, u_k, p_k) = J_{target}(z_k, p_k) + w_d \cdot d_k^2 + w_{d'} \cdot u_{d',k}^2 + w_{\delta'} \cdot u_{\delta',k}^2 + w_c \cdot \zeta(z_k, p_k) \quad \text{Equation (8)}$$

Terminal Costs Equation $$J_{terminal}(z_N, p_N) = J_{target}(z_N, p_N) + w_d \cdot d_N^2 + w_c \cdot \zeta(z_N, p_N) \quad \text{Equation (9)}$$

Where $J_{target}(z_k, p_k)$ and $J_{target}(z_N, p_N)$ are costs associated with the tracking objective discussed in detail with respect to FIG. 7C. $J_{target}(z_k, p_k)$ and $J_{target}(z_N, p_N)$ are a tracking function that is the same at intermediate steps and a terminal step. $w_{d'}$ $$w_d \cdot d_k^2 + w_{d'} \cdot u_{d',k}^2 + w_{\delta'} \cdot u_{\delta',k}^2$$

and $$w_d \cdot d_N^2$$

are costs associated with the comfort objective. $w_c \cdot \zeta(z_k, p_k)$ and $w_c \cdot \zeta(z_N, p_N)$ are costs associated with the collision-free motion objective. $\zeta(z_k, p_k)$ and $\zeta(z_N, p_N)$ are a collision cost function that is the same at intermediate steps and a terminal step, as described herein at least with respect to FIG. 7B.

The tracking objective may be defined by tracking costs equation (10).

Tracking Costs Equation $$J_{target}(z_k, p_k) = w_{\theta,k} \cdot \left((x_T - x_k)^2 + (y_T - y_k)^2\right) + w_{\theta,k} \cdot (\theta_T - \theta_k)^2 \quad \text{Equation (10)}$$

Where $x_T$, $y_T$, and $\theta_T$ are target locations and headings of the reference path 704 at different unit-distant steps $\lambda_k$. Each of $w_{\theta,k}$, $w_{target,k}$, $w_c$, $w_d$, $w_{\delta'}$, and $w_{d'}$ are weights for each respective component of the equations. In some cases, $w_{\theta,k}$ is much smaller than $w_{\theta,N}$, and $w_{target,k}$ is much smaller than $w_{target,N}$. For instance, "much smaller" may mean the weights are 1/10 the size, 1/100 the size, and the like.

Turning to FIG. 7B, FIG. 7B depicts an illustration 711 of the how the collision cost function $\zeta(z_k, p_k)$ may determine a cost. In particular, the ego 508 may have a plurality of points 710 and 712 associated with a footprint of the vehicle. To calculate the collision cost, the MPC system 500 may determine whether any one of the plurality of points 710 and 712 overlap any object of the occupancy map (e.g., have a location within a threshold distance to a location of an object). In this case, point 712 does not overlap an object and point 710 does overlap an object. For instance, the collision cost may be small (e.g., zero) if no points overlap, and large (relative to other costs) if any (e.g., one or more) point overlaps. In some cases, the collision cost of a potential path is an accumulated cost of all footprint probing points for all prediction steps.

Turning to FIG. 7C, FIG. 7C depicts an illustration 713 of how the costs associated with the tracking function $J_{target}(z_k, p_k)$ (associated with the tracking objective) may affect a determined travel path 714 to a MPC horizon 716. In particular, the reference path 704 extending from the ego 508. By using tracking costs equation (10), the MPC solver of the MPC system 500 determined a travel path 714 that deviated from the reference path 704 for intermediate steps of the unit-distant steps $\lambda_k$, while converging closer to the MPC horizon 716 (i.e., the intermediate location). In this way, the MPC system 500 may continue to generally track the reference path 704 but have flexibility to find lower cost solutions for, e.g., comfort and smooth motion. For instance, in some case, the MPC system 500 may track the MPC horizon 716 as the MPC horizon 716 is adjusted (e.g., recedes) at each iteration of a solve cycle. In particular, tracking costs equation (10) may use much smaller weights for the intermediate steps while using larger weights near the MPC horizon 716 to provide flexibility for the intermediate steps (e.g., decrease cost for deviating), and provide convergence near the MPC horizon 716 (e.g., increase cost for deviating near the MPC horizon 716).

Figure 8:
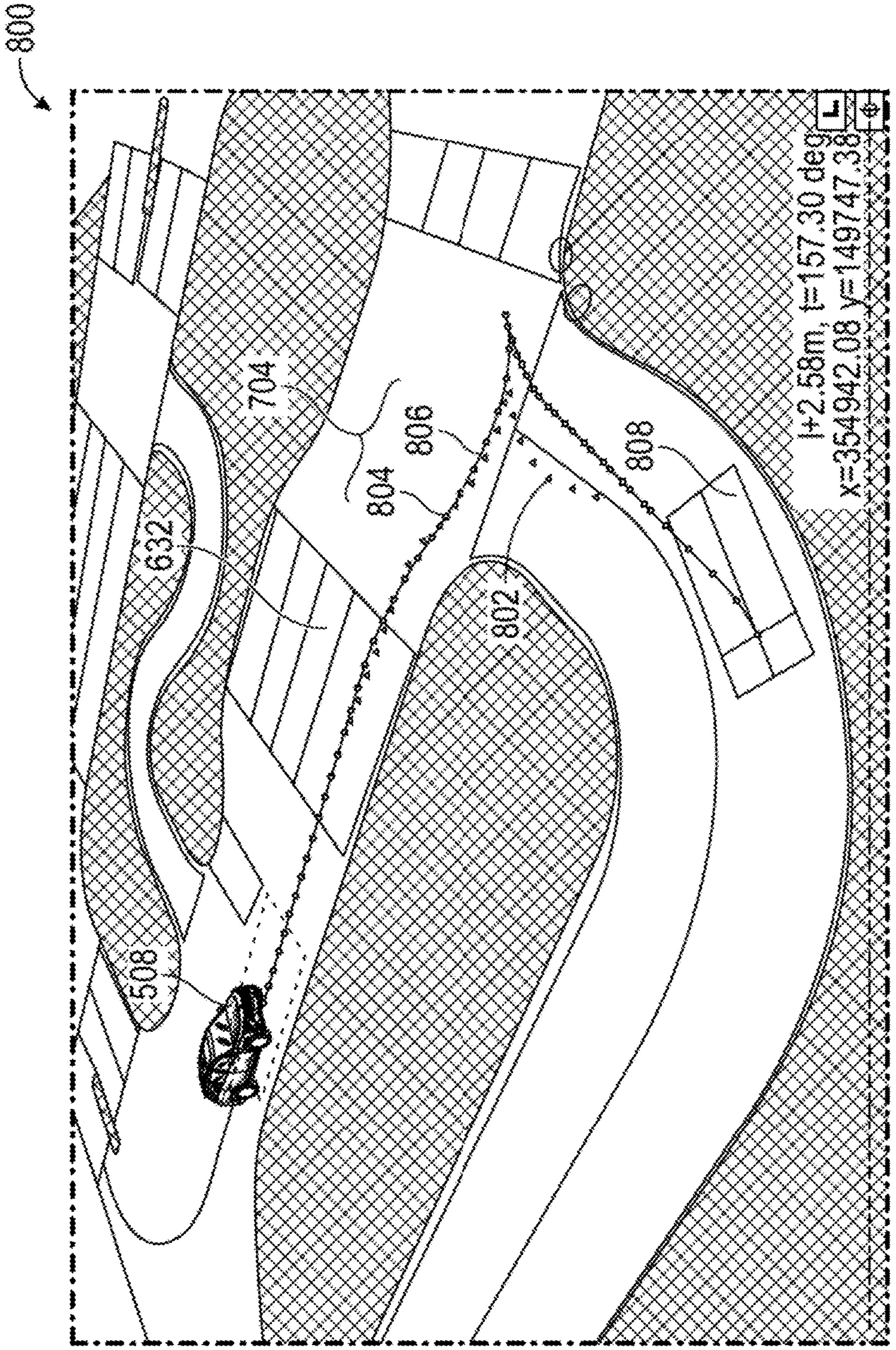
FIG. 8 is an illustration of an example travel path determined by a model predictive control system.

FIG. 8 is an illustration 800 of an example travel path 802 determined by a MPC system 500 within a grid representation 632. The MPC system 500 may determine the travel path 802, as described herein, using the reference path 704 to a destination location 808. The reference path 704 may include tracking targets 804 and sampling nodes 806. The sampling nodes 806 may be points, while executing the sampling-based routine, selected from the occupancy map and where discrete decisions are evaluated (e.g., should ego 508 continue forward or reverse, pass an object on the left or the right, etc.) to construct the reference path 704. The tracking targets 804 may depict the MPC horizon 716 over different solve cycles for the travel path 704. For instance, the tracking targets 804 may be determined based on a distance the autonomous vehicle can travel per prediction step propagated along the reference path 704 for each solve cycle. As depicted in FIG. 8, the travel path 802 may deviate from the reference path 704 while generally tracking the reference path 704.

After the MPC solver of the MPC system 500 determines the travel path 716, the MPC system 500 may determine control commands for the autonomous vehicle. For instance, the MPC system 500 may determine actuation commands (e.g., steering commands and throttle commands) based on the determined path 716. As an example, a low-level steering controller may use steering references (11).

Steering References $$\delta_r(t),\ \dot{\delta}_r(t) = \frac{\partial \delta_r}{\partial t}(t) \qquad \text{Equation 11}$$

Where $\delta_r(t)$ is a steering angle of the vehicle with respect to time and $\dot{\delta}_r(t)$ is a change rate of the steering angle of the vehicle with respect to time. Steering angle $\delta_r(t)$ may be determined by obtaining a measurement of vehicle pose at time t and querying a current progress s(t), given the determined travel path 716. The steering angle $\delta_r(t)$ may then be determined by inputting the current progress s(t) to steering angle query equation (12).

Steering Angle Query $$\delta_r(t) = \delta(s(t)) \qquad \text{Equation 12}$$

Thereafter, the chain rule may be applied in accordance with steering rate chain rule (13) to determine the change rate of the steering angle $\dot{\delta}_r(t)$.

Steering Rate Chain Rule $$\dot{\delta}_r(t) = \frac{\partial \delta}{\partial s(t)} \frac{\partial s(t)}{\partial t} \qquad \text{Equation 13}$$

Where $$\frac{\partial \delta}{\partial s}$$

is the steering angle over progress $u_{\delta'}$ determined for a prediction Where step, and $$\frac{\partial s(t)}{\partial t}$$

is a change rate of progress with respect to time. The change rate of progress with respect to time $$\frac{\partial s(t)}{\partial t}$$

may be obtained from a speed controller (e.g., feedback for a current speed of the autonomous vehicle). Moreover, the speed controller may determine a speed command or acceleration command given the determined travel path.

In some cases, when the MPC solver of the MPC system 500 is unable to determine a travel path that has an acceptable cost (e.g., less than a cost threshold for more than a preset number of cycles), the MPC system 500 may determine a stopping path. The stopping path may be a constant steering angle with an emergency stopping maneuver. In this manner, if the MPC system 500 cannot determine a travel path with an acceptable cost, the MPC system 500 determine to perform the emergency stopping maneuver and maintain safety of the autonomous vehicle.

Example Flow Diagram of Model Predictive Control System

Figure 9:
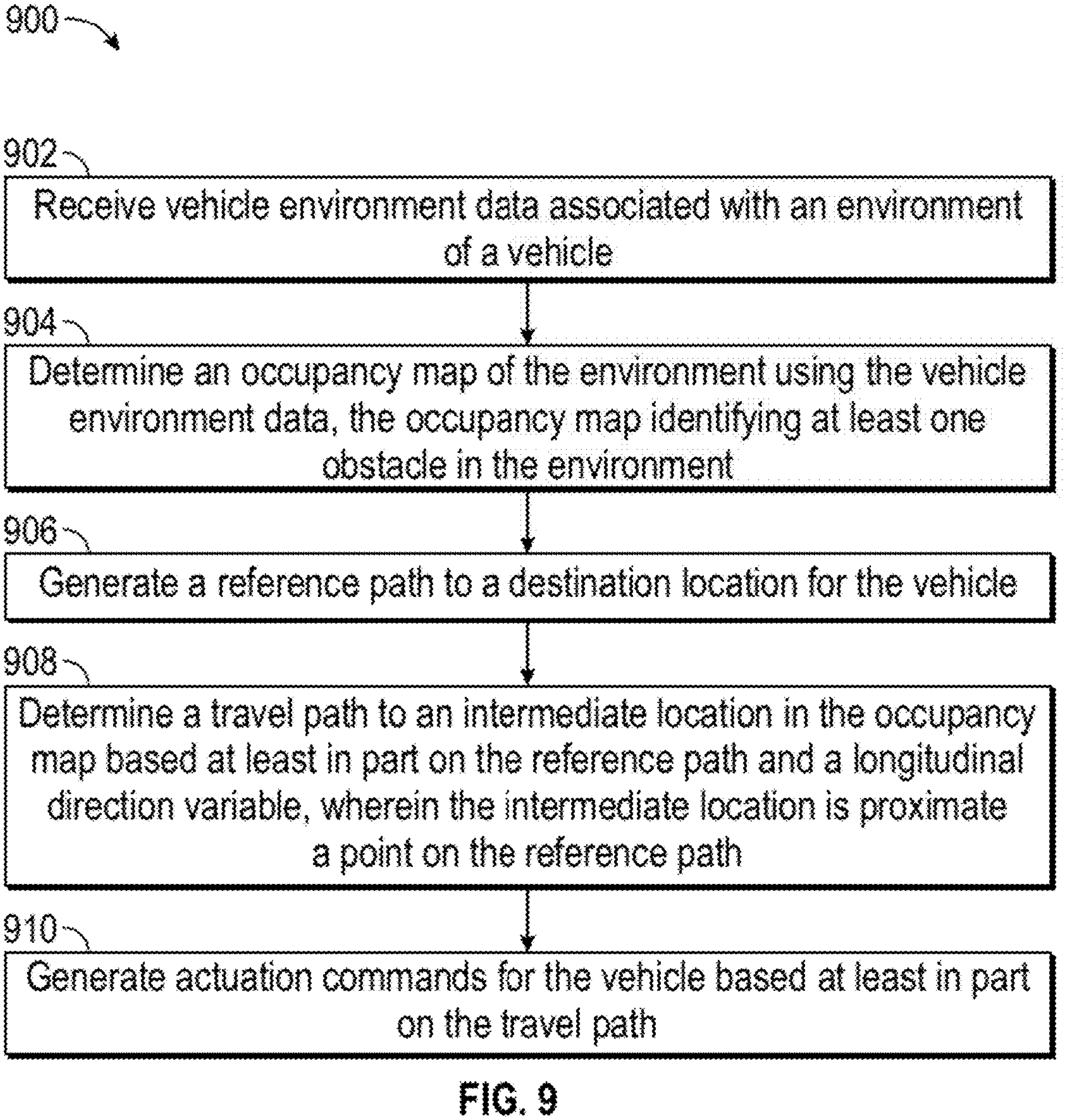
FIG. 9 is a flow diagram illustrating an example of a routine implemented by one or more processors to determine a travel path using a model predictive control system.

FIG. 9 is a flow diagram illustrating an example of a routine implemented by one or more processors to determine a travel path using a MPC system 500. The flow diagram illustrated in FIG. 9 is provided for illustrative purposes only. It will be understood that one or more of the steps of the routine 900 illustrated in FIG. 9 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 902, the MPC system 500 may receive vehicle environment data associated with an environment of a vehicle. For instance, the MPC system 500 may receive (continuously or periodically) receive the state of the ego 508 from the localization system 406 and/or receive the states of other vehicles 510, states of other objects 512, the local boundary 514, and/or the direction of travel 516 from the perception system 402 and/or based on 2D and/or 3D maps from the database 410, as described herein.

At block 904, the MPC system 500 may determine an occupancy map of the environment using the vehicle environment data, the occupancy map identifying at least one obstacle in the environment. For instance, the occupancy map engine 502B of the MPC system 500, asynchronously, may obtain the vehicle environment data, transform the data into a map coordinate system, and generate the occupancy map (with differentiable occupancy map evaluations), as described herein.

At block 906, the MPC system 500 may generate a reference path to a destination location for the vehicle. For instance, the reference path engine 502A of the MPC system 500, using the sampling-based routine, may asynchronously generate the reference path, as described herein.

At block 908, the MPC system 500 may determine a travel path to an intermediate location in the occupancy map based at least in part on the reference path and a longitudinal direction variable, wherein the intermediate location is proximate a point on the reference path. For instance, the MPC system 500 may generate potential paths, determine costs for the potential paths, and select a lowest cost potential path as the travel path, as described herein. Alternatively, the MPC system 500 may use the MPC solver and determine a lowest cost travel path in accordance with equations (1) through (13).

At block 910, the MPC system 500 may generate actuation commands for the vehicle based at least in part on the travel path. For instance, the MPC system 500 may determine a steering angle and a steering angle change rate in accordance with progress of the autonomous vehicle on the travel path, as described herein.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

Examples

Clause 1. A method, comprising: receiving vehicle environment data associated with an environment of a vehicle; determining an occupancy map of the environment using the vehicle environment data, the occupancy map identifying at least one obstacle in the environment; generating a reference path to a destination location for the vehicle; determining a travel path to an intermediate location in the occupancy map based at least in part on the reference path and a longitudinal direction variable, wherein the intermediate location is proximate a point on the reference path; and generating actuation commands for the vehicle based at least in part on the travel path.

Clause 2. The method of Clause 1, further comprising: determining a physical location of the vehicle in a physical coordinate system; and determining an occupancy map location of the vehicle by transforming the physical location of the vehicle from the physical coordinate system to a coordinate system of the occupancy map, wherein determining the travel path to the intermediate location comprises determining the travel path to the intermediate location using the occupancy map location of the vehicle.

Clause 3. The method of Clause 2, further comprising: transforming the reference path from the physical coordinate system to the coordinate system of the occupancy map, wherein determining the travel path to the intermediate location in the occupancy map based at least in part on the reference path and the longitudinal direction variable comprises determining the travel path to the intermediate location in the occupancy map using the reference path in the coordinate system of the occupancy map; and transforming the travel path from the coordinate system of the occupancy map to the physical coordinate system, wherein generating the actuation commands for the vehicle based at least in part on the travel path comprises generating the actuation commands for the vehicle using the travel path in the physical coordinate system.

Clause 4. The method of any of Clauses 1-3, wherein the longitudinal direction variable comprises a range of continuous numbers.

Clause 5. The method of Clause 4, wherein the continuous numbers that satisfy a number threshold represent a first longitudinal direction and the continuous numbers that do not satisfy the number threshold represent a second longitudinal direction.

Clause 6. The method of Clause 5, wherein the first longitudinal direction is forward and the second longitudinal direction is backward.

Clause 7. The method of any of Clauses 1-6, further comprising generating at least one differentiable occupancy map evaluation using the occupancy map, wherein determining the travel path to the intermediate location comprises determining the travel path to the intermediate location using the at least one differentiable occupancy map evaluation.

Clause 8. The method of Clause 7, wherein generating the at least one differentiable occupancy map evaluation comprises applying at least one third order B-spline basis function to the occupancy map Clause 9. The method of any of Clauses 1-8, wherein determining the travel path comprises: determining a plurality of potential paths based at least in part on at least one physical constraint of the vehicle and variations to a plurality of variable control inputs; determining a cost associated with each of the plurality of potential paths based at least in part on a weighting policy; and selecting the travel path from the plurality of potential paths based at least in part on the determined cost associated with each of the plurality of potential paths.

Clause 10. The method of Clause 9, wherein the at least one physical constraint of the vehicle comprises an angle of operation of a steering wheel of the vehicle.

Clause 11. The method of Clause 9, wherein each of the plurality of potential paths comprises a plurality of unit-distant steps, and wherein each unit-distant step of the plurality of unit-distant steps is associated with at least one variable control input.

Clause 12. The method of Clause 9, wherein the at least one physical constraint constrains a cartesian solution space of the travel path to within a region a predetermined distance from the reference path.

Clause 13. The method of Clause 9, wherein the at least one physical constraint constrains a vehicle heading to within a predetermined range of headings with respect to a given point on the reference path.

Clause 14. The method of Clause 9, wherein determining the cost associated with each of the plurality of potential paths based at least in part on the weighting policy includes determining a collision-free motion cost, a comfort cost, and a tracking cost for each of the plurality of potential paths.

Clause 15. The method of Clause 14, wherein the collision-free motion cost is based on an accumulation of costs, for all prediction steps, for each of a set of points of a vehicle footprint with respect to the at least one obstacle in the environment.

Clause 16. The method of Clause 14, wherein the comfort cost is based on, at each prediction step, at least a change rate of the longitudinal direction variable and a change rate of a steering angle.

Clause 17. The method of Clause 14, wherein the tracking cost is based on, at each prediction step, a first difference from a reference heading of the reference path at a tracking target location and a second difference from a reference location of the reference path at the tracking target location.

Clause 18. The method of Clause 14, wherein the weighting policy includes a plurality of weights for the collision-free motion cost, the comfort cost, and the tracking cost, and wherein a set of weights of the plurality of weights for the tracking cost include an intermediate weight for an intermediate prediction step before a final prediction step, and a final weight for the final prediction step, wherein the intermediate weight is substantially smaller than the final weight.

Clause 19. A system, comprising: at least one processor, and at least one non-transitory storage media storing instructions that, when executed by the at least one processor, cause the at least one processor to: receive vehicle environment data associated with an environment of a vehicle; determine an occupancy map of the environment using the vehicle environment data, the occupancy map identifying at least one obstacle in the environment; generate a reference path to a destination location for the vehicle; determine a travel path to an intermediate location in the occupancy map based at least in part on the reference path and a longitudinal direction variable, wherein the intermediate location is proximate a point on the reference path; and generate actuation commands for the vehicle based at least in part on the travel path.

Clause 20. At least one non-transitory storage media storing instructions that, when executed by at least one processor, cause the at least one processor to: receive vehicle environment data associated with an environment of a vehicle; determine an occupancy map of the environment using the vehicle environment data, the occupancy map identifying at least one obstacle in the environment; generate a reference path to a destination location for the vehicle; determine a travel path to an intermediate location in the occupancy map based at least in part on the reference path and a longitudinal direction variable, wherein the intermediate location is proximate a point on the reference path; and generate actuation commands for the vehicle based at least in part on the travel path.

What is claimed is:

1. A method, comprising:

receiving data associated with an environment of a vehicle;

determining an occupancy map of the environment using the data;

generating a reference path to a destination location for the vehicle;

determining a travel path to an intermediate location in the occupancy map based at least in part on the reference path and a longitudinal direction variable, wherein the intermediate location is proximate a point on the reference path, and wherein the longitudinal direction variable is associated with a forward longitudinal direction and a backward longitudinal direction; and generating actuation commands for the vehicle based at least in part on the travel path.

2. The method of claim 1, further comprising:

determining a physical location of the vehicle in a physical coordinate system; and determining an occupancy map location of the vehicle by transforming the physical location of the vehicle from the physical coordinate system to a coordinate system of the occupancy map, wherein determining the travel path to the intermediate location comprises determining the travel path to the intermediate location using the occupancy map location of the vehicle.

3. The method of claim 2, further comprising:

transforming the reference path from the physical coordinate system to the coordinate system of the occupancy map, wherein determining the travel path to the intermediate location in the occupancy map based at least in part on the reference path and the longitudinal direction variable comprises determining the travel path to the intermediate location in the occupancy map using the reference path in the coordinate system of the occupancy map; and transforming the travel path from the coordinate system of the occupancy map to the physical coordinate system, wherein generating the actuation commands for the vehicle based at least in part on the travel path comprises generating the actuation commands for the vehicle using the travel path in the physical coordinate system.

4. The method of claim 1, wherein the longitudinal direction variable comprises a range of continuous numbers.

5. The method of claim 4, wherein the continuous numbers that satisfy a number threshold represent the forward longitudinal direction and the continuous numbers that do not satisfy the number threshold represent the backward longitudinal direction.

6. The method of claim 1, further comprising generating at least one differentiable occupancy map evaluation using the occupancy map, wherein determining the travel path to the intermediate location comprises determining the travel path to the intermediate location using the at least one differentiable occupancy map evaluation.

7. The method of claim 6, wherein generating the at least one differentiable occupancy map evaluation comprises applying at least one third order B-spline basis function to the occupancy map.

8. The method of claim 1, wherein determining the travel path comprises:

determining a plurality of potential paths based at least in part on at least one physical constraint of the vehicle and variations to a plurality of variable control inputs;

determining a cost associated with each of the plurality of potential paths based at least in part on a weighting policy; and selecting the travel path from the plurality of potential paths based at least in part on the determined cost associated with each of the plurality of potential paths.

9. The method of claim 8, wherein the at least one physical constraint of the vehicle comprises an angle of operation of a steering wheel of the vehicle.

10. The method of claim 8, wherein each of the plurality of potential paths comprises a plurality of unit-distant steps, and wherein each unit-distant step of the plurality of unit-distant steps is associated with at least one variable control input.

11. The method of claim 8, wherein the at least one physical constraint constrains a cartesian solution space of the travel path to within a region a predetermined distance from the reference path.

12. The method of claim 8, wherein the at least one physical constraint constrains a vehicle heading to within a predetermined range of headings with respect to a given point on the reference path.

13. The method of claim 8, wherein determining the cost associated with each of the plurality of potential paths based at least in part on the weighting policy includes determining a collision-free motion cost, a comfort cost, and a tracking cost for each of the plurality of potential paths.

14. The method of claim 13, wherein the collision-free motion cost is based on an accumulation of costs, for all prediction steps, for each of a set of points of a vehicle footprint with respect to at least one obstacle in the environment.

15. The method of claim 13, wherein the comfort cost is based on, at each prediction step, at least a change rate of the longitudinal direction variable and a change rate of a steering angle.

16. The method of claim 13, wherein the tracking cost is based on, at each prediction step, a first difference from a reference heading of the reference path at a tracking target location and a second difference from a reference location of the reference path at the tracking target location.

17. The method of claim 13, wherein the weighting policy includes a plurality of weights for the collision-free motion cost, the comfort cost, and the tracking cost, and wherein a set of weights of the plurality of weights for the tracking cost include an intermediate weight for an intermediate prediction step before a final prediction step, and a final weight for the final prediction step, wherein the intermediate weight is substantially smaller than the final weight.

18. A system, comprising:

at least one processor, and at least one non-transitory storage media storing instructions that, when executed by the at least one processor, cause the at least one processor to:

receive data associated with an environment of a vehicle;

determine an occupancy map of the environment using the data;

generate a reference path to a destination location for the vehicle;

determine a travel path to an intermediate location in the occupancy map based at least in part on the reference path and a longitudinal direction variable, wherein the intermediate location is proximate a point on the reference path, and wherein the longitudinal direction variable is associated with a forward longitudinal direction and a backward longitudinal direction; and generate actuation commands for the vehicle based at least in part on the travel path.

19. At least one non-transitory storage media storing instructions that, when executed by at least one processor, cause the at least one processor to:

receive data associated with an environment of a vehicle;

determine an occupancy map of the environment using the data;

generate a reference path to a destination location for the vehicle;

determine a travel path to an intermediate location in the occupancy map based at least in part on the reference path and a longitudinal direction variable, wherein the intermediate location is proximate a point on the reference path, and wherein the longitudinal direction variable is associated with a forward longitudinal direction and a backward longitudinal direction; and generate actuation commands for the vehicle based at least in part on the travel path.

20. The at least one non-transitory storage media of claim 19, wherein the instructions, when executed by the at least one processor, further cause the at least one processor to:

determine a physical location of the vehicle in a physical coordinate system; and determine an occupancy map location of the vehicle by transforming the physical location of the vehicle from the physical coordinate system to a coordinate system of the occupancy map, wherein to determine the travel path to the intermediate location, the instructions, when executed by the at least one processor, cause the at least one processor to determine the travel path to the intermediate location using the occupancy map location of the vehicle.

* * * * *